United States Patent
Abaziou et al.

(10) Patent No.: US 10,377,360 B1
(45) Date of Patent: Aug. 13, 2019

(54) RESISTIVE SHORT CIRCUIT IMMUNITY FOR WHEEL SPEED SENSOR INTERFACE ON BRAKING SYSTEM

(71) Applicant: NXP USA, Inc., Austin, TX (US)

(72) Inventors: Sebastien Abaziou, Tournefeuille (FR); Benoit Alcouffe, Tournefeuille (FR); Jean-Christophe Rince, Midi Pyrenee (FR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/055,554

(22) Filed: Aug. 6, 2018

(30) Foreign Application Priority Data

Jul. 4, 2018 (EP) ..................................... 18305874

(51) Int. Cl.
*B60T 8/88* (2006.01)
*B60T 17/22* (2006.01)
*G01P 3/489* (2006.01)

(52) U.S. Cl.
CPC ............ *B60T 8/885* (2013.01); *B60T 17/221* (2013.01); *G01P 3/489* (2013.01); *B60T 2270/416* (2013.01)

(58) Field of Classification Search
CPC .. B60T 8/885; B60T 17/221; B60T 2270/416; G01P 3/489
USPC ...................................................... 340/636.13
See application file for complete search history.

(56) References Cited

U.S. PATENT DOCUMENTS

| | | | |
|---|---|---|---|
| 5,404,304 A * | 4/1995 | Wise | B60T 8/885 303/122.08 |
| 5,406,485 A * | 4/1995 | Wise | B60T 8/885 303/122.05 |
| 5,493,214 A | 2/1996 | Good et al. | |
| 6,282,954 B1 * | 9/2001 | Ott | G01P 3/489 180/197 |
| 6,491,357 B2 | 12/2002 | Holst | 303/122.03 |
| 7,520,573 B2 * | 4/2009 | Carpenter | B60T 8/885 303/122.05 |

(Continued)

FOREIGN PATENT DOCUMENTS

| | | |
|---|---|---|
| DE | 19602243 A1 | 10/1997 |
| DE | 19635440 A1 | 3/1998 |

(Continued)

OTHER PUBLICATIONS

Rince et al., "Companion Chip Short Circuit Immunity," U.S. Appl. No. 16/276,960, filed Feb. 15, 2018, 19 pages.

*Primary Examiner* — John A Tweel, Jr.

(57) ABSTRACT

An apparatus and method for resistive short circuit immunity for wheel speed sensor interface on a braking system. In one embodiment the apparatus includes a first circuit for generating a first periodic signal based on first current transmitted to a wheel speed sensor and a second circuit for generating a second periodic signal based on second current, some or all of which is received from the wheel speed sensor. A circuit is provided for selecting the first periodic signal for output if a magnitude of the second current is greater than a magnitude of the first current, or the second periodic signal for output if a magnitude of the second current is not greater than the magnitude of the first current. The selected first or second periodic signal contains information relating to a speed of a wheel that is associated with the wheel speed sensor.

20 Claims, 5 Drawing Sheets

(56) References Cited

U.S. PATENT DOCUMENTS

| | | | |
|---|---|---|---|
| 8,154,837 B2* | 4/2012 | Trapp | B60T 8/885 |
| | | | 361/87 |
| 9,664,241 B2* | 5/2017 | Wakao | B60W 50/0205 |
| 2003/0226702 A1 | 12/2003 | Imai et al. | |
| 2016/0154047 A1 | 6/2016 | Alcouffe et al. | |
| 2017/0299625 A1 | 10/2017 | Park | |

FOREIGN PATENT DOCUMENTS

| | | | |
|---|---|---|---|
| WO | 99/01774 | 1/1999 | |
| WO | WO 2017/110010 A1 | 6/2017 | B60T 7/12 |

\* cited by examiner

RESISTIVE SHORT CIRCUIT IMMUNITY FOR WHEEL SPEED SENSOR INTERFACE ON BRAKING SYSTEM

BACKGROUND

Sensors are devices that detect events or changes in quantities, and provide a corresponding output signal indicative thereof. In motor vehicles, bicycles and other vehicles, wheel speed sensors are used to obtain wheel speed information for use in a control system such as an anti-lock brake system (ABS). Active wheel speed sensors are a type of wheel speed sensors that are commonly used in newer vehicles for various reasons. Some active wheel speed sensors (hereinafter type I active wheel speed sensors) output a square wave current signal, the period of which is determined by the rotational speed of an associated wheel. The magnitude of other active wheel speed sensors may vary depending on whether the wheel is rotating in a forward direction or a reverse direction. Other types of active wheel speed sensors output pulse-width modulated signals in which additional information such as direction of rotation and magnetic field strength are coded. The output of still other types of active wheel speed sensors are encoded with diagnostic data. The present technology will be described with reference to type I active wheel speed sensors employed in motor vehicles, it being understood the present technology should not be limited thereto.

A wheel speed sensor interface circuit is connected between a wheel speed sensor (WSS) and an ABS controller (e.g., a microcontroller). The WSS interface circuit conditions the square wave output of the WSS for subsequent processing by the ABS controller. The ABS controller monitors speed information for all wheels of the vehicle. If the speed from one wheel changes abruptly with respect to other wheels, the ABS controller understands that one wheel is beginning to lose traction. It then takes the appropriate action by applying the brakes or performing traction control.

BRIEF DESCRIPTION OF THE DRAWINGS

The present technology may be better understood, and its numerous objects, features, and advantages made apparent to those skilled in the art by referencing the accompanying drawings.

The use of the same reference symbols in different drawings indicates similar or identical items unless otherwise noted. The Figures are not necessarily drawn to scale.

DETAILED DESCRIPTION

Environmental factors can lead to the creation of resistive shorts between a WSS terminal and ground, or between a WSS terminal and a DC power supply (e.g., a battery). For example dirt, road salt, corrosion, or water may accumulate on or near a WSS terminal and create a resistive short. Or a motor vehicle collision can jar a WSS or its electrical connections and create a resistive short. A resistive short can corrupt wheel speed information provided to an ABS system and adversely affect operation thereof.

Disclosed is a method and apparatus for detecting and responding to a temporary or permanent resistive short of a WSS. Although some examples of the present technology will be described with reference to a WSS interface circuit employed in an ABS of a motor vehicle, it is envisaged that this is simply one application that may benefit from the present technology. The present technology may be applied to any system that requires detection and response to a resistive short or other defect that adds a DC offset to a periodic signal output of a device.

Figure 1:
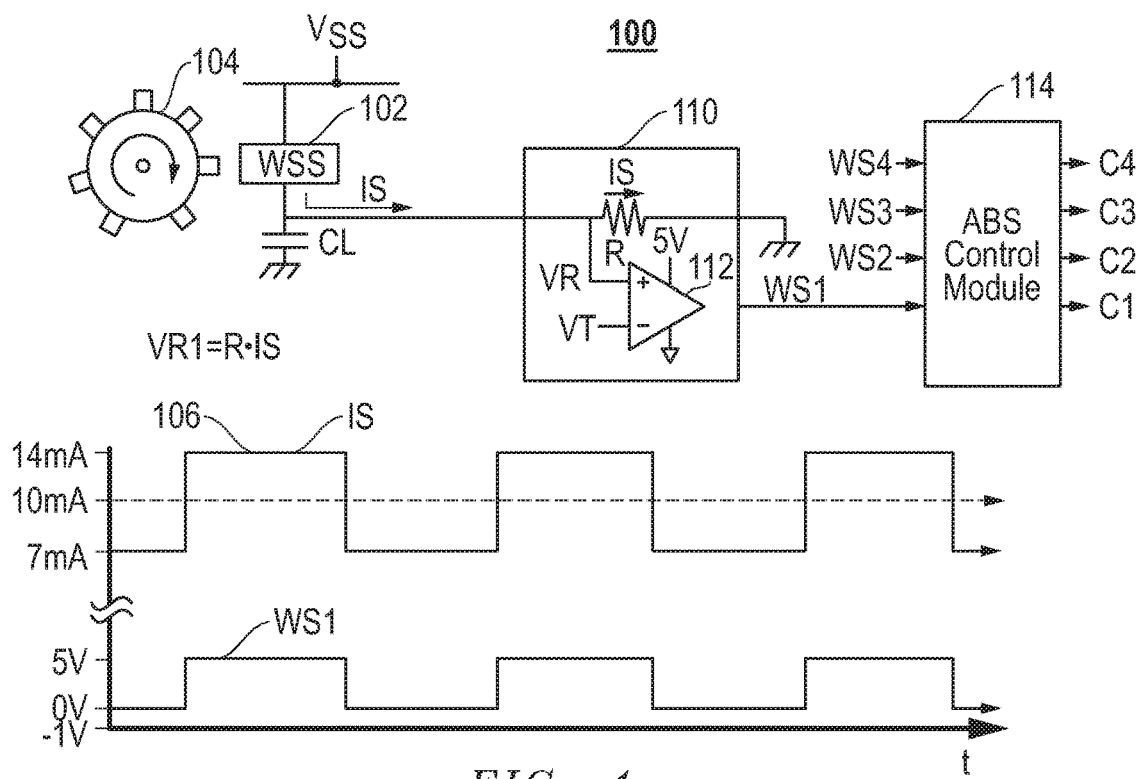
FIG. 1 illustrates an example wheel speed sensor interface circuit and operational aspects thereof.
Figure 2:
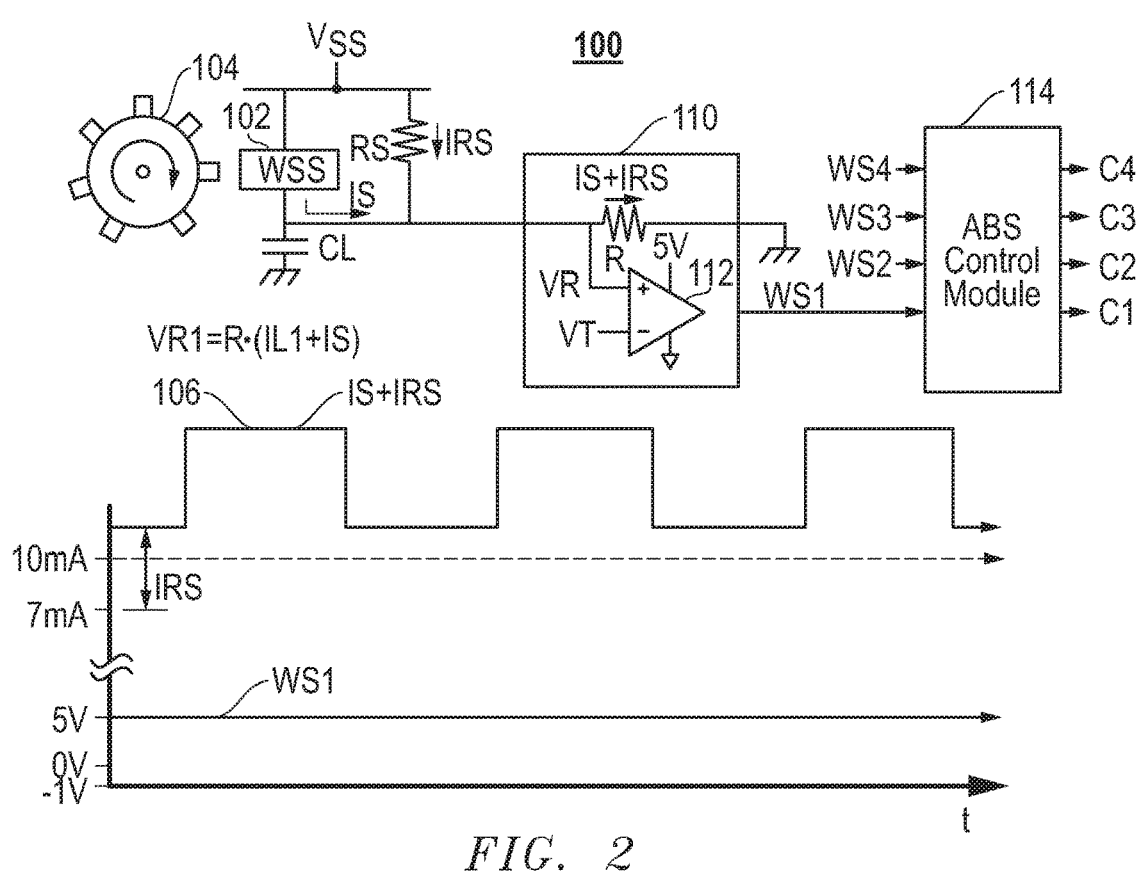
FIG. 2 illustrates the wheel speed sensor interface circuit of FIG. 1 and operational aspects thereof after a resistive short is created.

A temporary or permanent resistive short of a WSS may adversely affect operation of the system in which it is employed. FIGS. 1 and 2 illustrate a rudimentary WSS interface circuit 100 for generating wheel speed information signal WS1 based on current IS through WSS 102. FIGS. 1 and 2 are provided only as an aid to help the reader understand the problem caused by a temporary or permanent resistive short. The present technology should not be limited to that shown in FIGS. 1 and 2.

WSS 102 is closely positioned to a gear-shaped rotor (also known as a tone wheel) 104, which in turn is directly or indirectly attached to a wheel of a motor vehicle (not shown). Equally spaced teeth are positioned on the circumference of rotor 104, which spins at a speed that matches the rotational speed of the wheel to which it is attached. WSS 102 draws sensor current IS from a voltage supply Vss provided by a battery (not shown). As a tooth passes, WSS 102 draws a substantially constant current (e.g., IS=14 mA). Between teeth, WSS 102 draws a lower and substantially constant current (e.g., IS=7 mA). Square wave signal 106 in FIG. 1 represents IS as rotor 104 spins. Each pulse of square wave signal 106 represents a tooth passing WSS 102. The period of square wave signal 106 is directly proportional to wheel speed since rotor 104 is directly or indirectly attached to the wheel. As the rotation speed of rotor 104 increases, the frequency of square wave signal 106 increases, thereby indicating faster wheel speed. The period of square wave signal 106 may be used to determine wheel speed.

Interface circuit 110 conditions square wave signal 106 for further processing by an ABS control module 114. Interface circuit 110 includes a comparator 112 that compares sensor current IS to a predetermined, threshold level. Again, the term interface circuit should not be limited to that shown in FIGS. 1 and 2. Rather, interface circuit 110 is provided only as an aid to explain problems caused by resistive shorts.

Sensor current IS passes through resistor R to create a voltage VR, which is provided as one input to comparator 112. A predetermined voltage VT is provided to the other input of comparator 112. When VR is greater than VT, comparator 112 outputs a high voltage (e.g., 5 V), and when VR is less than VT, comparator 112 outputs a low voltage (e.g., 0 V). VT and the resistance of R are carefully selected so that the output of comparator 112 is 5 V when IS is greater than 10 mA (i.e., IS>10 mA), and output of comparator 112 is 0 V when IS is less than 10 mA (i.e., IS<10 mA).

WS1 is the output signal of comparator 112 and is shown in FIG. 1. Like signal 106, WS1 is a square wave that switches between 5 V and 0V as signal 106 switches between 7 mA and 14 mA. The frequency of WS1 matches the frequency of signal 106, which in turn depends on the rotational speed of rotor 104. WS1 is provided to ABS control module 114 as wheel speed information for the wheel corresponding to rotor 104. ABS control module 114 generates traction control signals C1-C4 based upon wheel speed signals WS1-WS4, respectively, received from respective interface circuits.

FIG. 2 shows WSS 102 of FIG. 1 after a resistive short RS is inadvertently created between the terminals of WSS 102. The resistive short RS may be caused by, for example, a piece of debris that inadvertently lodges itself within the system between the terminals of WSS 102. Resistive short RS transmits a direct current IRS. One of ordinary skill understands that IRS increases or shifts VR. If IRS is large enough, VR is consistently greater than VT, and as a result comparator 112 generates WS1 as a substantially constant 5 V signal as shown in FIG. 2. This signal lacks speed information for controller 114.

Figure 3:
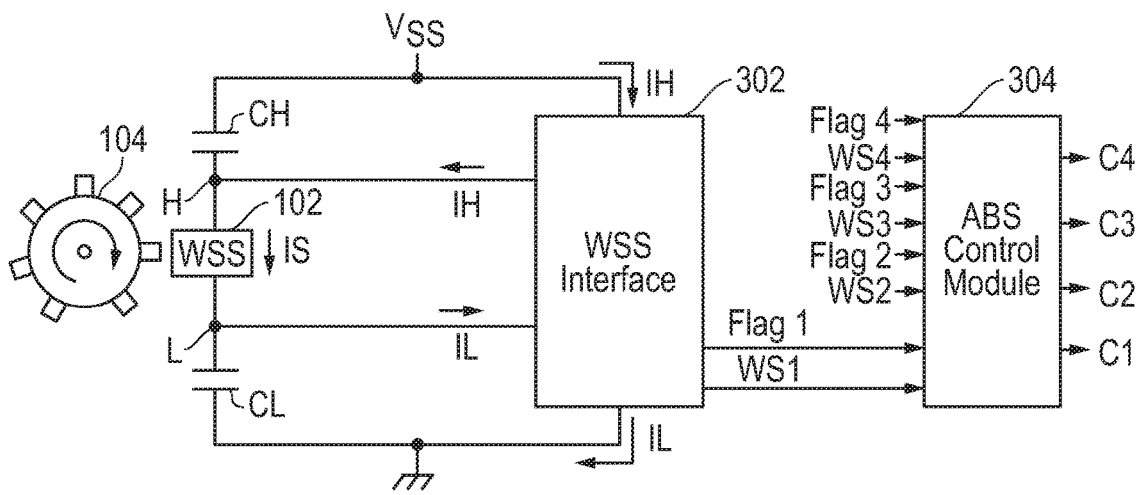
FIG. 3 illustrates an ABS system employing a wheel speed sensor interface circuit that implements one embodiment of the present technology.
Figure 4:
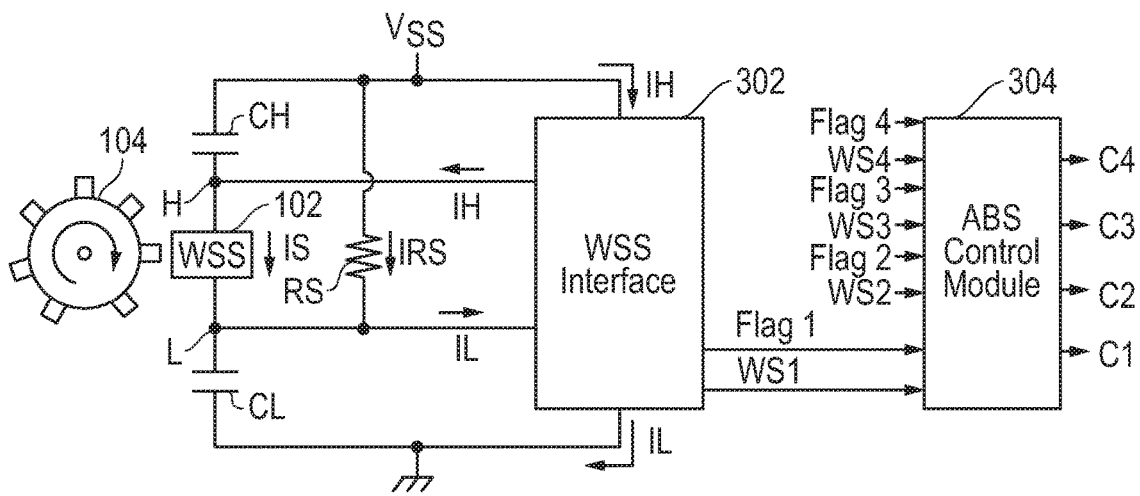
FIG. 4 illustrates the ABS system of FIG. 3 after the creation of a first type of resistive short.
Figure 5:
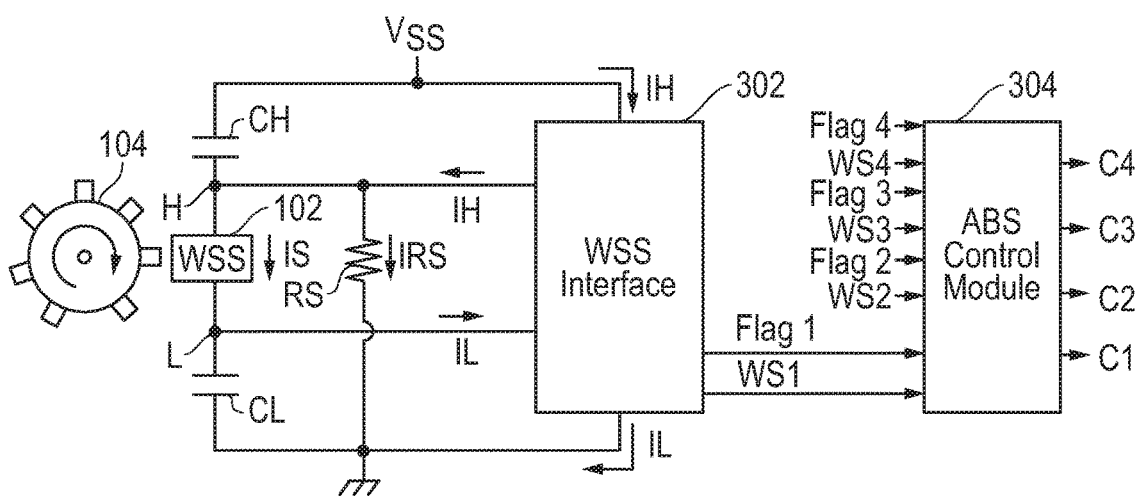
FIG. 5 illustrates the ABS system of FIG. 3 after the creation of a second type of resistive short.

FIG. 3 illustrates a system that includes an interface circuit 302, which can detect and respond to a resistive short of a WSS in accordance with one embodiment of the present technology. FIGS. 4 and 5 illustrate the system shown in FIG. 1 after a resistive short RS is created at WSS. For purposes of explanation only, FIGS. 3-5 will be described using the same WSS 102 and rotor 104 employed in FIGS. 1 and 2.

Figure 8:
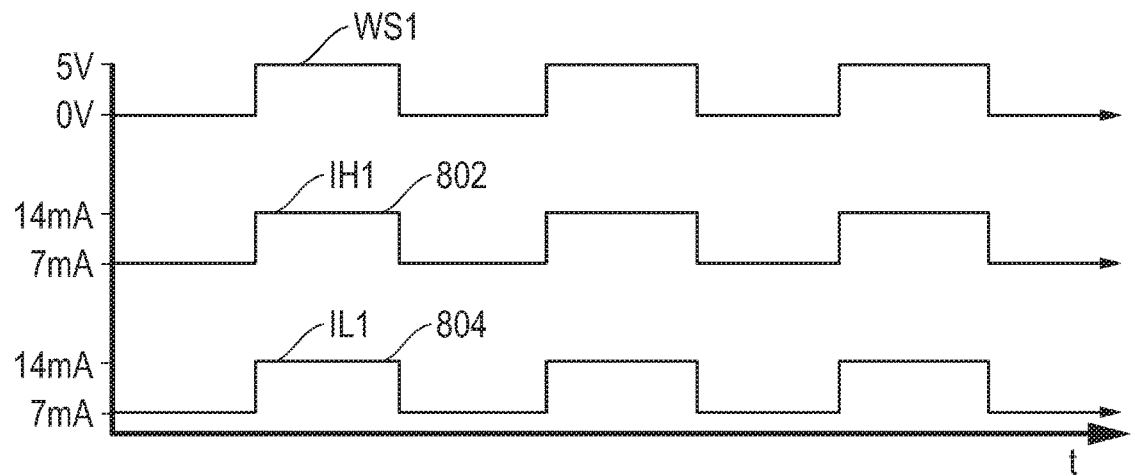
FIGS. 8-10 are graphical representations of inputs and outputs of the wheel speed sensor interface circuits of FIGS. 3-5, respectively.
Figure 9:
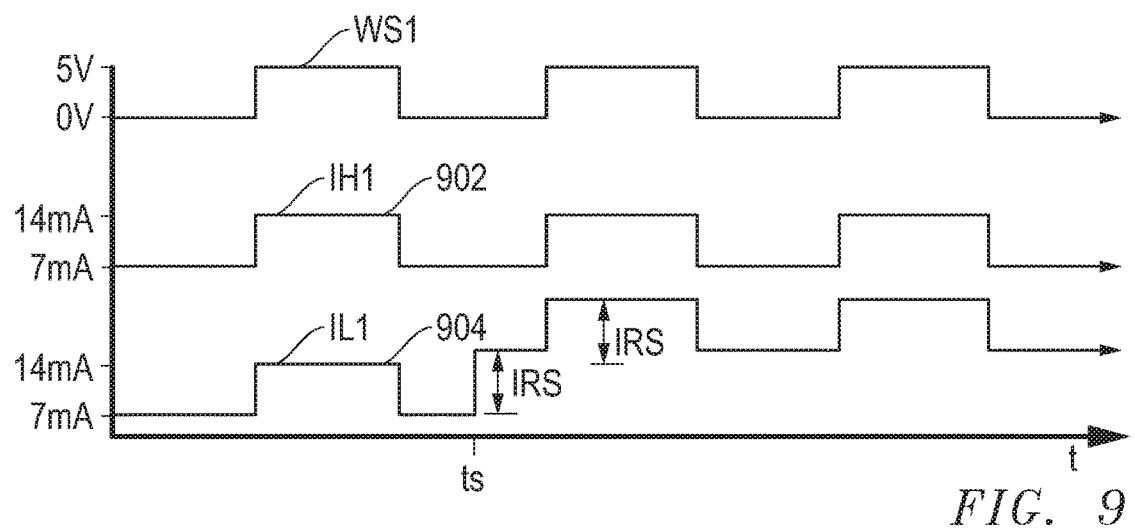
Figure 10:
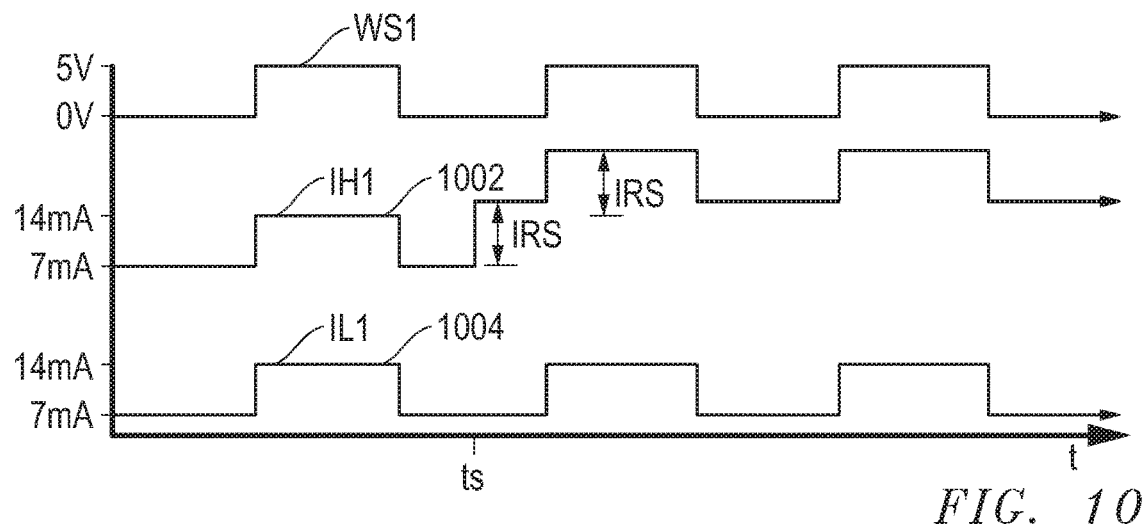

FIGS. 8-10 illustrate graphical representations of signals that are generated or received by interface circuit 302. FIGS. 3 and 8 illustrate operational aspects of interface circuit 302 when no resistive short is present at WSS 102. FIGS. 4 and 9 illustrate aspects of interface circuit 302 when a resistive short RS exists between Vss and terminal L of WSS 102. This may be referred to as a low side resistive short. FIGS. 5 and 10 illustrate aspects of interface circuit 302 when a resistive short RS exists between ground and terminal H of WSS 102. This may be referred to as the high side resistive short.

Interface circuit 302 transmits high side current IH with little or no resistance towards WSS 102. Interface circuit 302 also transmits low side current IL with little or no resistance to ground. IL and IH may be equal to each other depending upon whether a resistive short exists at a terminal of WSS 102; if no resistive short exists, IL and IH should be equal. Interface circuit 302 directly or indirectly compares IH and IL to determine if one is larger than the other by a predetermined value X. In one embodiment X=0. In other embodiments X is a non-zero value (e.g., 1 mA, 2 mA, 4 mA, 10 mA, etc.). Interface circuit 302 compares IH and IL in order to detect a resistive short exists at a terminal of WSS 102. If a resistive short is detected, interface circuit 302 transmits a signal (i.e., Flag1) to ABS control module 304. Flag1 can identify whether the resistive short exists at the H terminal or the L terminal of WSS 102. More importantly, if a resistive short is determined to exist, interface circuit 302 uses the lesser of IH and IL to directly or indirectly generate wheel speed signal WS1 for ABS control 302. An interface circuit and WSS similar to that shown in FIGS. 3-5 are provided for each wheel of a motor vehicle. The additional interface circuits transmits WS2-WS4 and Flag3-Flag4 to ABS control module 304 as shown.

WSS 102 and rotor 104 in FIGS. 3-5 operate in substantially the same manner as described above with respect to FIGS. 1 and 2. WSS 102 draws sensor current IS from a supply voltage Vss via interface circuit 302. IS returns to ground through a very low resistance path via interface circuit 302. IS varies as teeth of rotor 104 pass WSS 102. When any tooth passes, WSS 102 draws substantially constant current IS=14 mA. Between teeth, WSS 102 draws substantially constant current IS=7 mA.

FIG. 3 presents no resistive short. FIGS. 4 and 5 each show a resistive short RS at WSS 102. The resistive short RS in FIG. 4 is between Vss and terminal L. The resistive short RS in FIG. 5 is between terminal H and ground.

Since there is no resistive short in FIG. 3, IH=IL=IS. In FIG. 4 direct current IRS flows through resistive short RS to ground with sensor current IS. IRS and IS flow indirectly to ground via interface circuit 302. In FIG. 4, IH=IS, and IL=IS+IRS. In FIG. 5, direct current IRS flows directly to ground. In FIG. 5, IH=IS+IRS, and IL=IS. Interface circuit 302 employs a comparator (not shown) that directly or indirectly compares the difference between IL and IH a predetermined value X.

Figure 6:
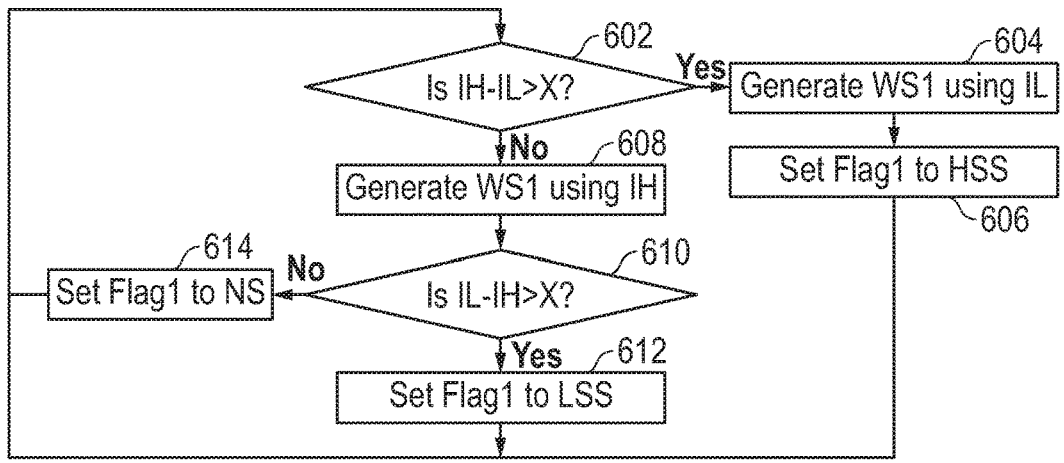
FIGS. 6 and 7 illustrate alternative methods employed by the wheel speed sensor interface circuit of FIG. 3.
Figure 7:
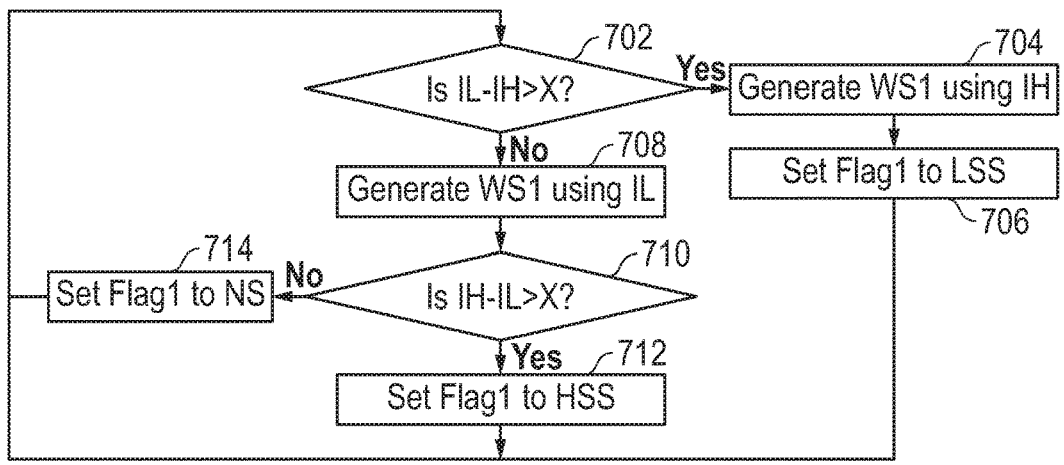

FIGS. 6 and 7 are flowcharts illustrating relevant aspects of alternative methods implemented by interface circuit 302. In step 602 of FIG. 6, the difference IH−IL is compared to X, which is a non-zero value in one embodiment. X=0 in another embodiment. If IH−IL>X, interface circuit 302 generates WS1 using IL as shown in step 604, and interface circuit 302 sets Flag1 to HSS as shown in step 606, which indicates that a resistive short exists between terminal H and ground. If IH−IL is not greater than X, then the process proceeds with step 608 in which interface circuit 302 generates WS1 using IH. In step 610 the difference IL−IH is compared to X. If IL−IH>X, interface circuit 302 sets Flag1 to LSS in step 612, which indicates that a resistive short exists between terminal L and Vss. If IL−IH is not greater than X in step 610, Flag1 is set to NS, which indicates no resistive short exists at WSS 102.

FIG. 7 is the alternative and possibly the preferred method implemented by interface circuit 302. In FIG. 7, interface circuit 302 in step 702 compares predetermined value X to the difference between IH and IL. If IL−IH>X, interface circuit 302 generates WS1 using IH. Interface circuit 302 also sets Flag1 to LSS, which indicates that a resistive short exists between terminal L and Vss. If IL−IH is not greater than X, then the process in FIG. 7 proceeds with step 708 in which interface circuit 302 generates WS1 using IL. In step 710 the difference IH−IL is compared to X. If IH−IL>X, interface circuit 302 sets Flag1 to HSS in step 712, which indicates that a resistive short exists between terminal H and ground. If IH−IL is not greater then X in step 710, Flag1 is set to NS. The remaining description will presume that interface circuit 302 implements the process shown in FIG. 7.

FIGS. 8-10 illustrate graphical representations of signals and currents described above. FIG. 8 corresponds to FIG. 3 in which no resistive short exists at WSS 102, and IH=IL1=IS. FIG. 8 shows square wave signals 802 and 804 representing IH and IL, respectively. Each pulse of signals 802 and 804 represent a rotor tooth passing WSS 102. As shown, there is no resistive short and WSS 102 draws IS=IL=IH=7 mA during each pulse. Between pulses IS=IH=IL=7 mA Implementing the process shown in FIG. 7, interface circuit 302 will select IL to generate WS1, which is also shown in FIG. 8. Interface circuit 302 also asserts Flag1=NS (i.e, no short) in accordance with process shown in FIG. 7.

FIG. 9 corresponds to FIG. 4 in which resistive short RS between terminal L and VSS is suddenly created at time t=ts. FIG. 9 shows square wave signals 902 and 904 representing IH and IL, respectively. Initially (i.e., before time t=ts) no resistive short RS exists, IS=IL=IH, and interface circuit 302 uses IL to generate WS1. However, at time t=ts resistive short RS is created and an additional current IRS is drawn directly from Vss and returned to ground via interface circuit 302. IH doesn't change (i.e., IH=IS) at time t=ts. However, IL does change at t=ts in FIG. 9. More particular, IL increases by IRS (i.e., IL=IS+IRS). Presuming IL−IH>X, interface circuit 302 switches to using IH to generate WS1 in accordance with step 704 of the process shown in FIG. 7. In addition interface circuit 302 switches Flag1 to LSS thereby indicating to ABS control 302 that a resistive short exists between terminal L and Vss in accordance with step 706. Interface circuit 302 will continue to assert Flag1=LSS as long as the resistive short exists between Vss and terminal L Importantly, as shown in FIG. 9, WS1 is unaffected by the creation of resistive short RS at time t=ts.

FIG. 10 corresponds to FIG. 5 in which resistive short RS between terminal H and ground is suddenly created at time t=ts. FIG. 10 shows square wave signals 1002 and 1004 representing IH and IL, respectively. Initially (i.e., before time t=ts) no resistive short RS exists, IS=IL=IH, and interface circuit 302 uses IL to generate WS1. However, at time t=ts resistive short RS is created and an additional current IRS is drawn from Vss via interface circuit 302. IL doesn't change (i.e., IL=IS) at time t=ts. However, IH increases by IRS (i.e., IH=IS+IRS). Presuming IH−IL>X, interface circuit 302 continues to use IL to generate WS1, but interface circuit 302 switches Flag1 to HSS thereby indicating to ABS control 302 that a resistive short exists between terminal H and ground Importantly, as shown in FIG. 10, WS1 is unaffected by the sudden creation of resistive short RS at time t=ts.

Figure 11:
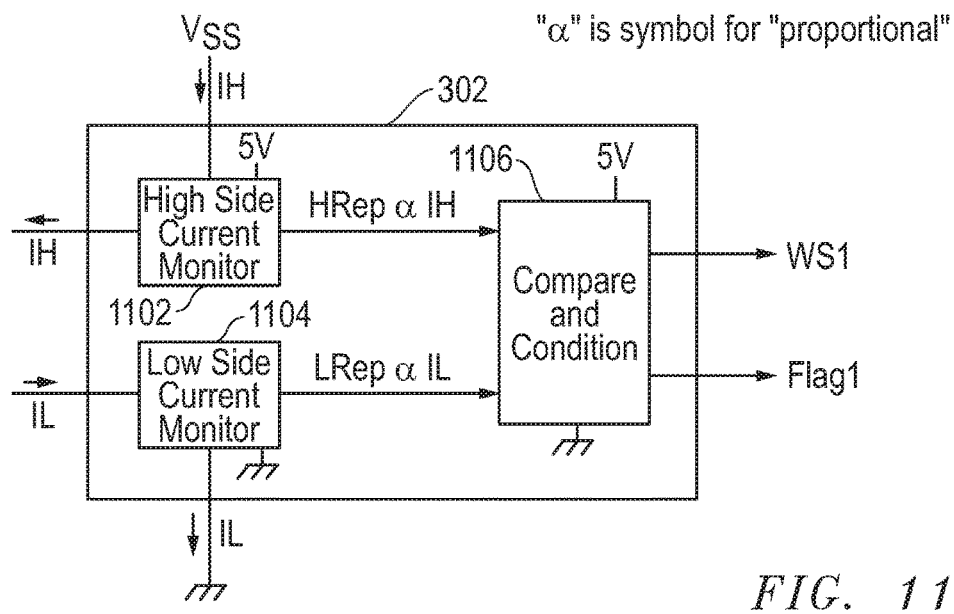
FIG. 11 illustrates one embodiment of the wheel speed sensor interface circuit employed in FIGS. 3-5.

As noted above, interface circuit 302 can directly or indirectly compare IH and IL to determine if a resistive short exists. FIG. 11 illustrates one embodiment of interface circuit 302 in which an indirect comparison is implemented. Interface circuit 302 in FIG. 11 includes a high side current monitor 1102 and a low side current monitor 1104. High side current monitor 1102 generates a signal Hrep, which is directly proportional to current IH transmitted by high side current monitor 1102 from supply voltage Vss towards WSS 102. Low side current monitor 1104 generates a signal Lrep that is directly proportional to current IL transmitted by low side current monitor 1104 to ground. Hrep and Lrep can be voltage signals that represent IH and IL, respectively, or Hrep and Lrep can be current signals that represent IH and IL, respectively. Hrep and LRep are provided as inputs to a compare and conditioning (CC) circuit 1106. This circuit compares Hrep and Lrep to determine which is larger, which in turn determines which of the currents IH and IL is larger. CC circuit 1106 selects one of the signals Hrep and Lrep for use in generating WS1. Circuit 1106 also compares Hrep and Lrep to determine whether a resistive short exists at WSS 102, and if so whether it is a high side and low side resistive short.

Figure 12:
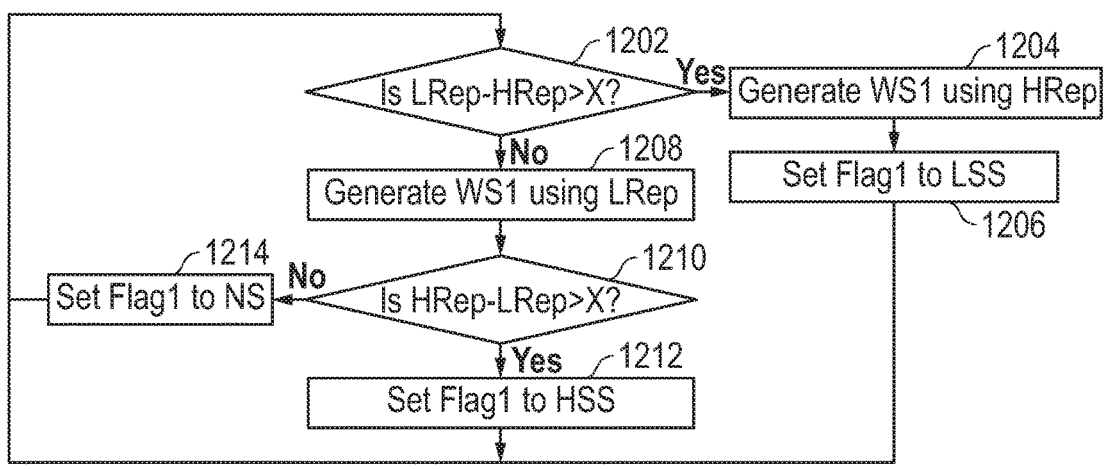
FIG. 12 is a method employed by the wheel speed sensor interface circuit of FIG. 11.

FIG. 12 is flowchart illustrating relevant aspects of a method implemented by CC circuit 1106. CC circuit 1106 employs a delta comparator (not shown in FIG. 12) that compares the predetermined value X to the difference between Hrep and Lrep. Again, in one embodiment, X is zero, and in other embodiments X is a non-zero current or voltage value. In step 1202, the difference Hrep-Lrep is compared to X. If Lrep-Hrep>X, circuit 1106 generates WS1 using Hrep as shown in step 1204, and CC circuit 1106 sets Flag1 to LSS in step 1206, which indicates that a resistive short exists between terminal L and Vss. If Lrep-Hrep is not greater then X, then the process proceeds with step 1208 in which circuit 1106 generates WS1 using Lrep. In step 1210 the same or a different delta comparator (not shown) compares Hrep-Lrep to X. If Hrep-Lrep>X, CC circuit 1106 sets Flag1 to HSS in step 1212, which indicates that a resistive short exists between terminal H and ground. If Hrep-Lrep is not greater then X in step 1210, Flag1 is set to NS.

Again it is noted that both Hrep and Lrep can be current signals, or both Hrep and Lrep can be voltage signals. In the embodiment which Hrep and Lrep are current signals, the difference between Hrep and Lrep may be compared to X, where X is expressed as value in milliamps (e.g., X=0.5 mA). In the embodiment which Hrep and Lrep are voltage signals, the difference between Hrep and Lrep may be compared to X, where X is expressed as value in volts (e.g., X=2 V). Either way, CC circuit 1106 generates wheel speed signal WS1 based upon Hrep or Lrep.

Figure 13:
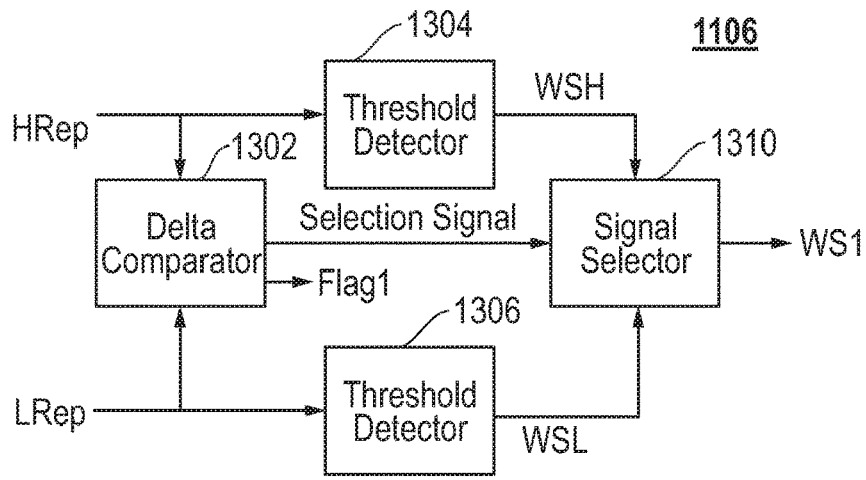
FIG. 13 illustrates one embodiment of the compare and condition circuit employed in FIG. 11.
Figure 14:
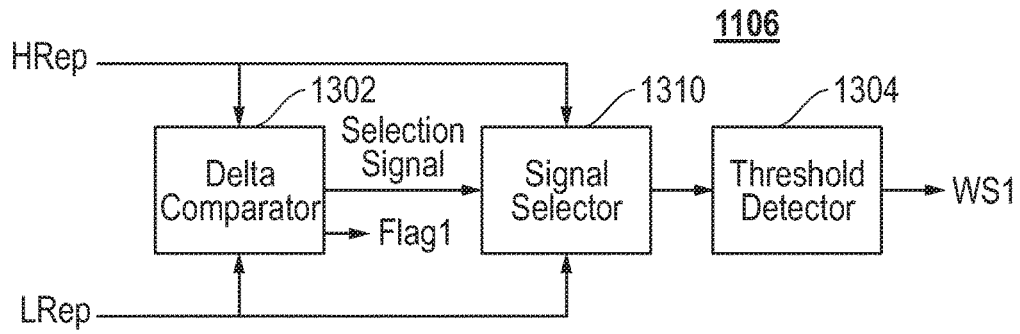
FIG. 14 illustrates another embodiment of the compare and condition circuit employed in FIG. 11.

CC circuit 1106 may employ a delta comparator, a signal selector, and one or more threshold detectors. FIG. 13 illustrates one embodiment of CC circuit in block diagram form 1106. FIG. 14 illustrates another embodiment of CC circuit 1106 in block diagram. CC circuits should not be limited to that shown in FIG. 13 or 14.

With continuing reference to FIGS. 11 and 12, the CC circuit 1106 in FIG. 13 includes a delta comparator 1302, and a pair of threshold detectors 1304 and 1306 that are coupled to receive HRep and Lrep from the high side and low side current monitors 1102 and 1104 as shown. Threshold detectors 1304 and 1306 output square wave signals WSH and WSL, respectively, based upon HRep and LRep, respectively. Each of threshold detectors 1304 and 1306 compares the input signals HRep and LRep, respectively, with one or more threshold values. In one embodiment, each threshold detector compares its input signal to a first threshold value. If the input signal exceeds the first threshold value, the threshold detector outputs 5 V. While the threshold detector outputs 5 V, the threshold detector compares its input signal to a second threshold value, which is less than the first threshold value. If the input signal drops below the second threshold value, the threshold detector switches the output to 0 V. While the threshold detector outputs 0 V, the threshold detector again compares the input signal to the first threshold value, and will again switch the output to 5 V when the input signal exceeds the first threshold value. In this manner, threshold detector 1304 generates output square signal WSH, and threshold detector 1306 generates output square signal WSL. Assuming no resistive short exists, the frequency of square waves WSH and WSL should be the same as the frequencies of HRep and LRep, respectively.

WSH and WSL square wave signals are provided as inputs to signal selector 1310. Signal selector 1310 also receives a selection signal from delta comparator 1302. Delta comparator 1302 compares HRep and LRep in accordance with steps to 1202 or 1210 shown in FIG. 12. Delta comparator 1302 asserts the selection signal (e.g., selection signal is set to logic 1) when Lrep-Hrep>X. Otherwise delta comparator 1302 deasserts the selection signal. Signal selector 1310 outputs square wave signal WSH as WS1 when the selection signal is asserted. Otherwise signal selector 1310 outputs square wave WSL as WS1.

FIG. 14 illustrates an alternative embodiment of CC circuit 1106. With continuing reference to FIGS. 11-13, the embodiment shown in FIG. 14 employs most of the components shown in FIG. 13. However, the components are arranged differently and have different inputs. For example, signal selector 1310 receives Hrep and Lrep as inputs. Signal selector 1310 selects HRep for output to threshold detector 1304 when delta comparator 1302 asserts its selection signal. Delta comparator 1302 asserts the selection signal when Lrep-Hrep>X. Otherwise signal selector 1310 selects LRep for output to threshold detector 1304. Detector 1304 generates WS1 based upon the input signal selected by signal selector 1310 in much the same manner as described above.

A first embodiment of the method includes transmitting a first current to a wheel speed sensor, and receiving a second current, some or all of which is received from the wheel speed sensor. A first periodic signal is generated based on the first current. A second periodic signal is generated based on the second current. The first periodic signal is selected for output if a magnitude of the second current is greater than a magnitude of the first current. The second periodic signal is selected for output if magnitude of the second current is not greater than the magnitude of the first current. The selected first or second periodic signal includes information relating to a speed of a wheel that is associated with the wheel speed sensor.

The magnitude of the second current is greater than a magnitude of the first current when the magnitude of the second current exceeds the magnitude of the first current by a predetermined amount, and the magnitude of the second current is not greater than a magnitude of the first current when the magnitude of the second current does not exceed the magnitude of the first current by the predetermined amount.

The first embodiment of the method may also include generating a third current based on the first current, wherein a magnitude of the third current is directly proportional to the magnitude of the first current. A fourth current can be generated based on the second current, wherein a magnitude of the fourth current is directly proportional to the magnitude of the second current. The third current can be compared with the fourth current. The act of selecting the first or second periodic signal is performed in response to comparing the third and fourth currents.

The first periodic signal can be generated directly from the third current, and the second periodic signal can be generated directly from the fourth current.

The method may also include setting a signal to a first state if the first current is greater than the second current, wherein the first state indicates that a resistive short exists between a first terminal of the wheel speed sensor and a ground within an electrical system. The signal is set to a second state if the second current is greater than the first current, wherein the second state indicates that a resistive short exists between a second terminal of the wheel speed sensor and a supply voltage within the electrical system.

The first current changes as teeth of a rotor pass near the wheel speed sensor, and the second current changes as teeth of the rotor pass near the wheel speed sensor.

The first embodiment of method may also include generating a first voltage based on the first current, wherein a magnitude of the first voltage is directly proportional to the magnitude of the first current. A second voltage can be generated based on the second current, wherein a magnitude of the second voltage is directly proportional to the magnitude of the second current. The first and second voltages can be compared wherein the act of selecting the first or second periodic signal is performed in response to comparing the first and second voltages.

The first periodic signal is generated directly from the first voltage, and the second periodic signal is generated directly from the second voltage.

One embodiment of an apparatus employing the present technology may include a first circuit for transmitting a first current to a wheel speed sensor, a second circuit for receiving a second current, some or all of which may be received from the wheel speed sensor. A first threshold detection circuit may be included for generating a first periodic signal based on the first current. A second threshold detection circuit may be included for generating a second periodic signal based on the second current. A circuit may be included that can select the first periodic signal for output if a magnitude of the second current is greater than a magnitude of the first current. The circuit can select the second periodic signal for output if magnitude of the second current is not greater than the magnitude of the first current. The selected first or second periodic signal includes information relating to a speed of a wheel that is associated with the wheel speed sensor.

The magnitude of the second current is greater than a magnitude of the first current when the magnitude of the second current exceeds the magnitude of the first current by a predetermined amount, and the magnitude of the second current is not greater than a magnitude of the first current when the magnitude of the second current does not exceed the magnitude of the first current by the predetermined amount.

The apparatus may further include a first current monitor circuit for generating a third current based on the first current, wherein a magnitude of the third current is directly proportional to the magnitude of the first current. A second current monitor circuit can generate a fourth current based on the second current, wherein a magnitude of the fourth current is directly proportional to the magnitude of the second current. A comparator circuit can compare the third current with the fourth current. The circuit selects the first or second periodic signal in response to is the comparator circuit comparing the third and fourth currents.

The first threshold detection circuit generates the first periodic signal directly from the third current, and second threshold detection circuit generates the second periodic signal directly from the fourth current.

The comparator circuit of the apparatus can set a signal to a first state if the first current is greater than the second current, wherein the first state indicates that a resistive short exists between a first terminal of the wheel speed sensor and a ground within an electrical system. The comparator circuit can set the signal to a second state if the second current is greater than the first current, wherein the second state indicates that a resistive short exists between a second terminal of the wheel speed sensor and a supply voltage within the electrical system.

The apparatus may further include a first current monitor circuit for generating a first voltage based on the first current, wherein a magnitude of the first voltage is directly proportional to the magnitude of the first current. A second current monitor circuit may also be included for generating a second voltage based on the second current, wherein a magnitude of the second voltage is directly proportional to the magnitude of the second current. The comparator circuit can compare the first and second voltages.

The first threshold detection circuit can generate the first periodic signal directly from the first voltage, and the second threshold detection circuit can generate the second periodic signal directly from the second voltage.

A system is disclosed that includes a first circuit for generating a first periodic signal based on first current transmitted to a wheel speed sensor. A second circuit can generate a second periodic signal based on second current some or all of which is received from the wheel speed sensor. A circuit can select the first periodic signal for output if a magnitude of the second current is greater than a magnitude of the first current, wherein the circuit is configured to select the second periodic signal for output if magnitude of the second current is not greater than the magnitude of the first current. The selected first or second periodic signal comprises information relating to a speed of a wheel that is associated with the wheel speed sensor.

The magnitude of the second current is greater than a magnitude of the first current when the magnitude of the second current exceeds the magnitude of the first current by a predetermined amount, and the magnitude of the second current is not greater than a magnitude of the first current when the magnitude of the second current does not exceed the magnitude of the first current by the predetermined amount.

The system may also include a first current monitor circuit for generating a third current based on the first current, wherein a magnitude of the third current is directly proportional to the magnitude of the first current. A second current monitor circuit can generate a fourth current based on the second current, wherein a magnitude of the fourth current is directly proportional to the magnitude of the second current. A comparator circuit can compare the third current with the fourth current. The circuit selects the first or second periodic signal in response to the comparator circuit comparing the third and fourth currents.

The comparator circuit can set a signal to a first state if the first current is greater than the second current. The first state indicates that a resistive short exists between a first terminal of the wheel speed sensor and a ground within an electrical system. The comparator circuit can set the signal to a second state if the second current is greater than the first current. The second state indicates that a resistive short exists between a second terminal of the wheel speed sensor and a supply voltage within the electrical system.

The system may include a first current monitor circuit generating a first voltage based on the first current. The magnitude of the first voltage is directly proportional to the magnitude of the first current. A second current monitor circuit can generate a second voltage based on the second current. A magnitude of the second voltage is directly proportional to the magnitude of the second current. The comparator circuit can compare the first and second voltages. The circuit can select the first or second periodic signal in response to the comparator circuit comparing the first and second voltages.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   transmitting a first current to a wheel speed sensor;
   receiving a second current, some or all of which is received from the wheel speed sensor;
   generating a first periodic signal based on the first current;
   generating a second periodic signal based on the second current;
   selecting the first periodic signal for output if a magnitude of the second current is greater than a magnitude of the first current;
   selecting the second periodic signal for output if the magnitude of the second current is not greater than the magnitude of the first current;
   wherein the selected first or second periodic signal comprises information relating to a speed of a wheel that is associated with the wheel speed sensor.

2. The method of claim 1 wherein the magnitude of the second current is greater than a magnitude of the first current when the magnitude of the second current exceeds the magnitude of the first current by a predetermined amount, and wherein the magnitude of the second current is not greater than a magnitude of the first current when the magnitude of the second current does not exceed the magnitude of the first current by the predetermined amount.

3. The method of claim 1 further comprising:
   generating a third current based on the first current, wherein a magnitude of the third current is directly proportional to the magnitude of the first current;
   generating a fourth current based on the second current, wherein a magnitude of the fourth current is directly proportional to the magnitude of the second current;
   comparing the third current with the fourth current;
   wherein the act of selecting the first or second periodic signal is performed in response to comparing the third and fourth currents.

4. The method of claim 3:
   wherein the first periodic signal is generated directly from the third current;
   wherein the second periodic signal is generated directly from the fourth current.

5. The method of claim 1 further comprising:
   setting a signal to a first state if the first current is greater than the second current, wherein the first state indicates that a resistive short exists between a first terminal of the wheel speed sensor and a ground within an electrical system;
   setting the signal to a second state if the second current is greater than the first current, wherein the second state indicates that a resistive short exists between a second terminal of the wheel speed sensor and a supply voltage within the electrical system.

6. The method of claim 1:
   wherein the first current changes as teeth of a rotor pass near the wheel speed sensor,
   wherein the second current changes as teeth of the rotor pass near the wheel speed sensor.

7. The method of claim 1 further comprising:
   generating a first voltage based on the first current, wherein a magnitude of the first voltage is directly proportional to the magnitude of the first current;
   generating a second voltage based on the second current, wherein a magnitude of the second voltage is directly proportional to the magnitude of the second current;
   comparing the first and second voltages;
   wherein the act of selecting the first or second periodic signal is performed in response to comparing the first and second voltages.

8. The method of claim 1:
   wherein the first periodic signal is generated directly from the first voltage;
   wherein the second periodic signal is generated directly from the second voltage.

9. An apparatus comprising:
a first circuit for transmitting a first current to a wheel speed sensor;
a second circuit for receiving a second current, some or all of which may be received from the wheel speed sensor;
a first threshold detection circuit for generating a first periodic signal based on the first current;
a second threshold detection circuit for generating a second periodic signal based on the second current;
a circuit, wherein the circuit is configured for selecting the first periodic signal for output if a magnitude of the second current is greater than a magnitude of the first current, wherein the circuit is configured to select the second periodic signal for output if the magnitude of the second current is not greater than the magnitude of the first current;
wherein the selected first or second periodic signal comprises information relating to a speed of a wheel that is associated with the wheel speed sensor.

10. The apparatus of claim 9 wherein the magnitude of the second current is greater than a magnitude of the first current when the magnitude of the second current exceeds the magnitude of the first current by a predetermined amount, and wherein the magnitude of the second current is not greater than a magnitude of the first current when the magnitude of the second current does not exceed the magnitude of the first current by the predetermined amount.

11. The apparatus claim 9 further comprising:
a first current monitor circuit for generating a third current based on the first current, wherein a magnitude of the third current is directly proportional to the magnitude of the first current;
a second current monitor circuit for generating a fourth current based on the second current, wherein a magnitude of the fourth current is directly proportional to the magnitude of the second current;
a comparator circuit for comparing the third current with the fourth current;
wherein the circuit selects the first or second periodic signal in response to the comparator circuit comparing the third and fourth currents.

12. The apparatus of claim 11:
wherein the first threshold detection circuit generates the first periodic signal directly from the third current;
wherein second threshold detection circuit generates the second periodic signal directly from the fourth current.

13. The apparatus of claim 11:
wherein the comparator circuit is configured to set a signal to a first state if the first current is greater than the second current, wherein the first state indicates that a resistive short exists between a first terminal of the wheel speed sensor and a ground within an electrical system;
wherein the comparator circuit is configured to set the signal to a second state if the second current is greater than the first current, wherein the second state indicates that a resistive short exists between a second terminal of the wheel speed sensor and a supply voltage within the electrical system.

14. The apparatus of claim 9 further comprising:
a first current monitor circuit generating a first voltage based on the first current, wherein a magnitude of the first voltage is directly proportional to the magnitude of the first current;
a second current monitor circuit generating a second voltage based on the second current, wherein a magnitude of the second voltage is directly proportional to the magnitude of the second current;
wherein the comparator circuit is configured for comparing the first and second voltages;
wherein the circuit is configured for selecting the first or second periodic signal is performed in response to the comparator circuit comparing the first and second voltages.

15. The apparatus of claim 9:
wherein first threshold detection circuit is configured to generate the first periodic signal directly from the first voltage;
wherein second threshold detection circuit is configured to generate the second periodic signal directly from the second voltage.

16. A system comprising:
a first circuit for generating a first periodic signal based on first current transmitted to a wheel speed sensor;
a second circuit for generating a second periodic signal based on second current some or all of which is received from the wheel speed sensor;
a circuit, wherein the circuit is configured for selecting the first periodic signal for output if a magnitude of the second current is greater than a magnitude of the first current, wherein the circuit is configured to select the second periodic signal for output if the magnitude of the second current is not greater than the magnitude of the first current;
wherein the selected first or second periodic signal comprises information relating to a speed of a wheel that is associated with the wheel speed sensor.

17. The system of claim 16 wherein the magnitude of the second current is greater than a magnitude of the first current when the magnitude of the second current exceeds the magnitude of the first current by a predetermined amount, and wherein the magnitude of the second current is not greater than a magnitude of the first current when the magnitude of the second current does not exceed the magnitude of the first current by the predetermined amount.

18. The system of claim 16 further comprising:
a first current monitor circuit for generating a third current based on the first current, wherein a magnitude of the third current is directly proportional to the magnitude of the first current;
a second current monitor circuit for generating a fourth current based on the second current, wherein a magnitude of the fourth current is directly proportional to the magnitude of the second current;
a comparator circuit for comparing the third current with the fourth current;
wherein the circuit selects the first or second periodic signal in response to the comparator circuit comparing the third and fourth currents.

19. The system of claim 18:
wherein the comparator circuit is configured to set a signal to a first state if the first current is greater than the second current, wherein the first state indicates that a resistive short exists between a first terminal of the wheel speed sensor and a ground within an electrical system;
wherein the comparator circuit is configured to set the signal to a second state if the second current is greater than the first current, wherein the second state indicates that a resistive short exists between a second terminal of the wheel speed sensor and a supply voltage within the electrical system.

20. The system of claim 16 further comprising:
a first current monitor circuit generating a first voltage based on the first current, wherein a magnitude of the first voltage is directly proportional to the magnitude of the first current;
a second current monitor circuit generating a second voltage based on the second current, wherein a magnitude of the second voltage is directly proportional to the magnitude of the second current;
wherein the comparator circuit is configured for comparing the first and second voltages;
wherein the circuit is configured for selecting the first or second periodic signal is performed in response to the comparator circuit comparing the first and second voltages.

* * * * *